Feb. 14, 1961 G. J. HIMLER ET AL 2,972,113

HIGH GAIN TIME DISCRIMINATOR

Filed May 14. 1956 2 Sheets-Sheet 1

INVENTORS.
GARY J. HIMLER
OTTIE C. MITCHELL
BY

William R. Lane
ATTORNEY

HIGH GAIN TIME DISCRIMINATOR

Filed May 14. 1956 2 Sheets-Sheet 2

*INVENTORS.*
GARY J. HIMLER
OTTIE C. MITCHELL
*BY* William R. Lane
ATTORNEY 2,972,113

HIGH GAIN TIME DISCRIMINATOR

Gary J. Himler, Lakewood, and Ottie C. Mitchell, Whittier, Calif., assignors to North American Aviation, Inc.

Filed May 14, 1956, Ser. No. 584,641

2 Claims. (Cl. 328—109)

This invention relates to time discriminators and more particularly to an electronic circuit for sensing small values of time misalignment between two pulse signals and to deliver a low impedance D.-C. error current proportional in value and amount to the sense and direction of the misalignment.

In the field of radar, systems for automatic tracking of a target include a device to measure the sense and approximate magnitude of the inequality between the return signal from the target and a locally generated time pulse. This time measurement device, known as a time discriminator, yields an error signal proportional to the tracking error which is then utilized in the radar system to position the range gate.

The design of time discriminators to meet the exacting requirements of present day radars has posed many problems. One of the more serious difficulties presented is that of providing an output error signal (microamperes per microsecond of misalignment) of sufficient magnitude to meet the requirements of the radar pulse position servo system. Another problem of equal magnitude is to design a coupling network which provides efficient transfer of error current to the pulse position servo during the signal interval, and still provide a complete isolation between these circuits in the absence of a signal. This requirement must be met if accurate velocity memory is to be obtained.

In the past, methods to overcome the above enumerated problems have involved complicated circuits which were only partially successful, leaving much to be desired. Present day time discriminator circuits still have insufficient gain in the output error signal to permit completely stable operation.

The circuit of this invention contemplates the time comparison of a video target signal and a range pulse, converting the conventional D.-C. output of such a circuit to an audio or stretched error pulse, amplifying this pulse greatly, and converting the amplified audio pulse back to a D.-C. error signal of increased gain. In order to accomplish this, a simple R.-C. circuit is connected to the output of the electronic switch to convert the conventional low level D.-C. error signal to a stretched pulse. The stretched pulse then is amplified many times by a standard audio amplifier. The amplified stretched pulses are peak detected to produce a D.-C. error output similar in sense but greatly increased in amplitude over that obtained at the output of the conventional electronic switch. In addition, a simple, effective way of changing the gain in the discriminator circuit to allow a change in band width of the radar tracking system is provided. In the absence of signals isolation of the pulse position servo is provided by a back bias circuit in the peak detector. These and other improvements to be described hereinafter are accomplished with a small number of electronic tubes and other circuit elements.

It is therefore an object of this invention to provide an improved time discriminator.

It is a further object of this invention to provide a discriminator which senses extremely small values of time misalignment between two pulse signals.

It is still another object of this invention to provide a circuit which produces complete isolation for the pulse position servo in the absence of signals.

It is a further object of this invention to provide a time discriminator which exhibits sufficient gain to be used in the forward loop of a pulse position servo system.

It is a further object of this invention to provide a time discriminator with improved stability and velocity memory characteristics.

It is a still further object of this invention to provide a discriminator circuit with improved gain characteristics.

Other objects of invention will become apparent from the following description taken in connection with the accompanying drawings, in which Fig. 1 is a circuit diagram of the invention;

Figure 1:
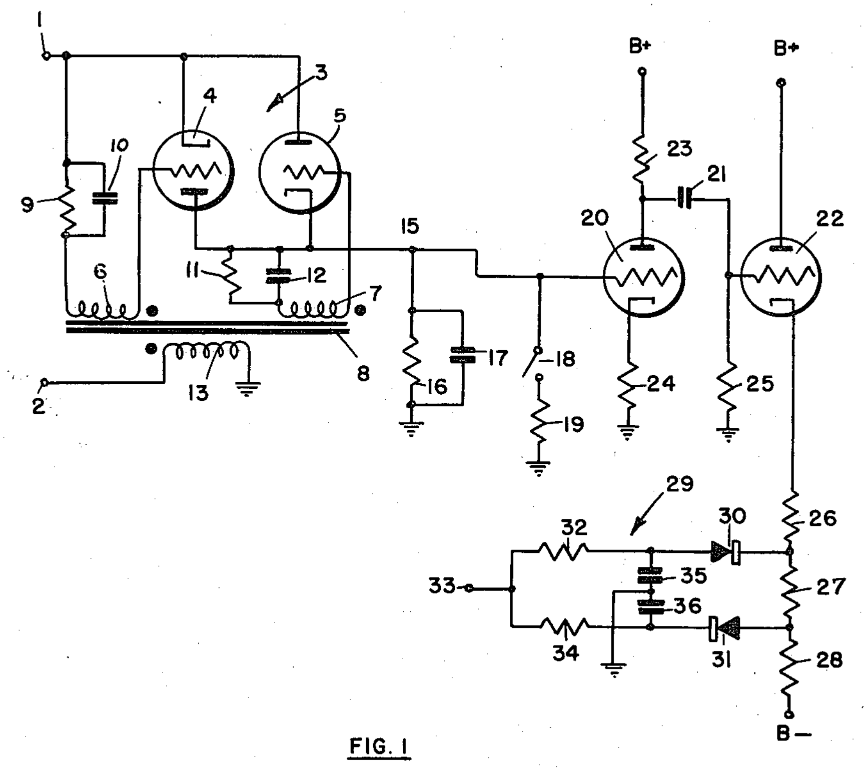

Referring to Fig. 1, a source of bipolar video pulses is applied to input terminal 1, and a source of range pulses is applied to input terminal 2. These two signals are compared in an electronic switch 3 which comprises two triodes 4 and 5 with the cathode of triode 4 and the anode of triode 5 connected to input 1. The grids of triodes 4 and 5 are connected to one side of each of two secondary windings 6 and 7, respectively, of transformer 8. The other side of secondary winding 6 is connected through grid bias resistor 9 and capacitor 10 connected in parallel to the cathode of triode 4. Similarly, the other side of secondary winding 7 is connected through grid bias resistor 11 and capacitor 12 to the cathode of triode 5. Primary winding 13 of transformer 8 is connected to input terminal 2 at one end and ground at the other end. Polarity dots on windings 6, 7 and 13 indicate the instantaneous phase relation of the transformer windings. Output terminal 15 is connected to a point common to the anode of triode 4 and the cathode of triode 5. Connected from point 15 to ground is a parallel circuit consisting of resistor 16 and capacitor 17. Also connected between point 15 and ground, and in parallel with resistor 16 and capacitor 17, is switch 18 and resistor 19. The output of electronic switch 3 is connected through point 15 to the grid of triode 20 which functions as an audio amplifier. Capacitor 21 couples the anode of triode 20 to the grid of triode 22 which acts as a cathode follower. A positive potential is supplied to the anode of triode 20 through resistor 23 and to the anode of triode 22 directly. The cathode of triode 20 is connected to ground through resistor 24. The grid of triode 22 is connected to ground through resistor 25. The output of cathode follower 22 is fed to a circuit consisting of resistors 26, 27 and 28 connected in series to B—. Connected to the circuit of resistors 26, 27 and 28 is peak detector circuit 29. Diode 30 is connected to the junction of resistors 26 and 27, and diode 31 is connected to the junction of resistors 27 and 28. Diode 30 is connected through summing resistor 32 to output terminal 33 and allows D.-C. current to flow therein. Diode 31 is connected through summing resistor 34 to output terminal 33 and allows a D.-C. current to flow therein. Capacitor 35 is connected from the junction of resistor 32 and diode 30 to ground, and capacitor 36 is connected from the junction of resistor 34 and diode 31 to ground. Capacitors 35 and 36 filter for peak detector 29.

In operation, a bipolar video signal received from the target and applied to terminal 1 is compared in bidirectional switch 3 with a range pulse applied to terminal 2. The range pulse applied to terminal 2 is fed to primary winding 13 of transformer 8 and induced in secondary windings 6 and 7 from where the pulse is fed to the control grids of triodes 4 and 5, causing grid current to flow in said triodes. The grid current charges capacitors 10 and 12 to establish a cutoff bias for triodes 4 and 5 until the grids are again driven to conduction by the next range pulse. Thus, for the duration of the range pulse, the path between input terminal 1 and output terminal 15 is completed, permitting current flow in either direction through switch 3. The negative portion of the bipolar video pulse at terminal 1 acts as a supply voltage for triode 4, and the positive portion of the bipolar video pulse acts as a supply voltage for triode 5. When the range pulse applied to terminal 2 leads in time the incoming bipolar video signal applied to terminal 1, current flows through triode 4 charging capacitor 17 in such a manner that the output at point 15 is a negative error signal. Conversely, when the range pulse lags in time the video signal, a positive error signal is obtained at point 15. Capacitor 17 is charged by each incoming D.-C. error signal from point 15 and discharges through resistor 16 during the time interval between pulses, thus providing a stretched error pulse to the control grid of triode 20. Triode 20, acting as a high again audio amplifier, delivers a signal to cathode follower triode 22. Resistors 26, 27 and 28 connected to the cathode of triode 22 form a voltage division such that the cathode of diode 30 is slightly positive with respect to its anode, and the anode of diode 31 is slightly negative with respect to its cathode. In the absence of signal, this back bias disconnects the time discriminator from its load connected to terminal 33. Since resistor 28 is large compared to resistor 27, the error pulses applied to diodes 30 and 31 are essentially equal in amplitude. When the error pulses at resistor 27 are positive enough to overcome the back bias signal, diode 31 conducts, causing current to flow through resistor 34 to output 33. When the error pulses at resistor 27 are negative, diode 30 conducts, causing current to flow through resistor 32 to output 33. The error signal at terminal 33 is a low impedance D.-C. current proportional in amplitude to the amount of misalignment between the bipolar video signal and the range pulse. Its polarity is determined by the direction of misalignment. The magnitude of the D.-C. current at terminal 33, because of the large amplification through amplifier 20, is of sufficient energy to meet the requirements of the range tracking servo system of the radar to which it is fed. When it is desired to lower the gain of the error signal, switch 18 is closed thereby shunting resistor 19 across resistor 16. This reduces the width of the error pulse presented to the grid of triode 20 thereby reducing the energy reaching detector 29 and therefore the magnitude of the output error current.

Figure 2:
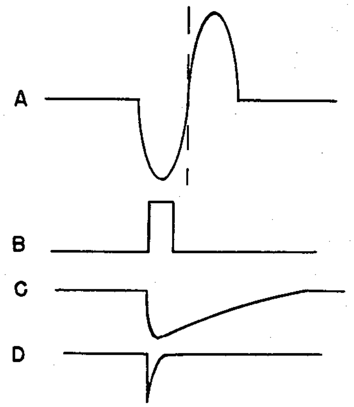
Fig. 2 is a graph showing the wave form characteristics of the discriminator when the range pulse leads the bipolar video signal.
Figure 4:
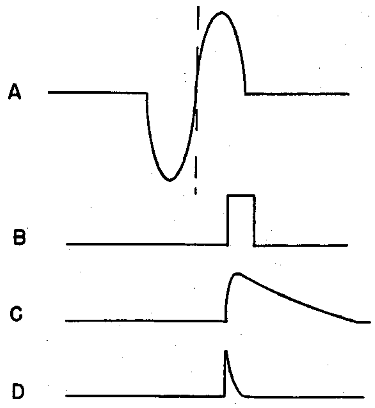
Fig. 4 is a graph showing the wave form characteristics of the discriminator when the range pulse lags the bipolar video signal.
Figure 3:
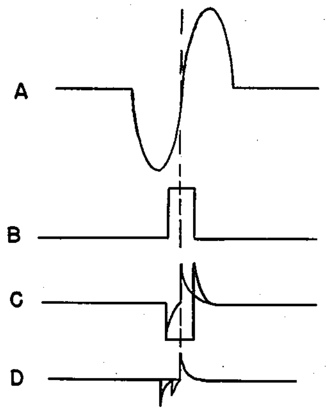
Fig. 3 is a graph showing the wave form characteristics of the discriminator when the range pulse coincides with the bipolar signal.

Turning now to Figs. 2, 3 and 4, graphs are shown which indicate the wave form characteristics of the discriminator circuit at the different comparison possibilities. In Fig. 2, the range pulse shown in Fig. 2B is leading the bipolar video signal shown in Fig. 2A. Fig. 2C shows the output error signal as presented to amplifier 20 after being converted into a stretched pulse of considerable width by resistor 16 and capacitor 17. The wave form in 2C, which is a negative pulse, is amplified by amplifier 20, and converted to D.-C. by peak detector 29. Fig. 2D represents output presented to amplifier 20 when switch 18 is closed. The output is a pulse of reduced width but of equal amplitude to the pulse in Fig. 2C. The width has been reduced by shunting resistor 19 across resistor 16 lowering the time constant of the R.-C. circuit. In Fig. 3, the range pulse at Fig. 3B coincides with the crossover point of the video signal in Fig. 3A, thus calling for zero error output. This is achieved by producing equal and opposite current flow through triodes 4 and 5. In Fig. 4, the range pulse at Fig. 4B lags the video signal at Fig. 4A. The wave form at 4C which is a positive pulse, is amplified by amplifier 20 and converted to a D.-C. signal by peak detector 29. Fig. 4D represents the output presented to amplifier 20 when switch 18 is closed. It is a pulse of reduced width, but of equal amplitude to the pulse in 4C.

Figure 5:
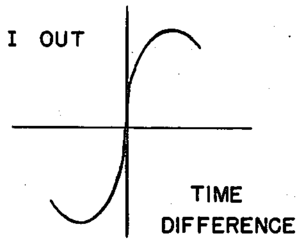
Fig. 5 is a graph showing the relation of output current to the time difference of the input signals.

Fig. 5 is a graph of current output vs. time difference of the input signals received at terminals 1 and 2. As shown, the slope of the curve is steep thereby causing the output current at terminal 33 to be high for a slight change in time difference between the input signals.

The time discriminator circuit of this invention as described and shown in Fig. 1 is readily adaptable to radars such as ground-ranging monopulse systems which provide an elevation error signal proportional to the tracking error. This error signal may be inserted directly to the grid of amplifier 20 as shown in Fig. 1. The signal is then greatly amplified and rectified as described hereinbefore to provide a D.-C. error signal of low impedance and high gain.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In an electronic circuit, an imput terminal connected to be responsive to bipolar signals, a first unidirectional current path connected to said input terminal, a second unidirectional current path connected to said input terminal, said second unidirectional current path oppositely disposed from said first unidirectional current path, means for controlling the conduction of said first and second unidirectional current paths, said controlling means being connected to be responsive to signals from a common source whereby one or the other of said unidirectional current paths conducts depending on the time phase of signals applied to said input terminal and said means for controlling the conduction of said unidirectional current paths, a storage circuit connected to receive the output of said current paths and present output pulses of predetermined width, amplifier means connected to receive the output of said storage circuit, rectifier means connected to receive the output of said amplifier, and means for back biasing said rectifier whereby only signals above predetermined values are rectified.

2. In combination, a first and second current path connected to receive a first electrical signal, means for controlling the current flow in said current paths, said means responsive to a second electrical signal differing in time phase from said first signal, said first current path undirectionally conductive when the second of said signals leads the first, said second current path conductive when the second of said signals lags the first, an R.C. circuit comprising a capacitor and a resistor in parallel to convert said unidirectional pulses to alternating-current pulses, means to vary the time constant of said R.C. circuit whereby said alternating-current pulses may be varied in width, means for amplifying said alternating-current pulses, cathode follower means responsive to the output of said amplifying means, detecting means connected to said cathode follower means whereby the output of said detecting means is a measure of the magnitude and sense of the difference between said first and second electrical signals, said detecting means comprising a first diode having its anode connected to the output of said cathode follower means, a second diode having its cathode connected through a resistor to the anode of said first diode, the cathode of said first diode connected through a resistor to the anode of said second diode.

References Cited in the file of this patent

UNITED STATES PATENTS 2,532,338 Schlesinger ------------ Dec. 5, 1950
2,583,832 Goldberg -------------- Jan. 29, 1952
2,605,410 Friend ---------------- July 29, 1952
2,625,662 Gaynor ---------------- Jan. 13, 1953
2,761,130 Kibler ---------------- Aug. 28, 1956
2,806,946 Rich ------------------ Sept. 17, 1957
2,812,435 Lyon ------------------ Nov. 5, 1957
2,814,725 Jacobs ---------------- Nov. 26, 1957
2,837,644 Shallon --------------- June 3, 1958